US009495267B2

(12) United States Patent  
Buege et al.

(10) Patent No.: US 9,495,267 B2
(45) Date of Patent: Nov. 15, 2016

(54) METHOD AND DEVICE FOR QUASI-PROXY ASSISTED MANUAL DEVICE TESTING

(71) Applicant: Spirent Communications, Inc., Sunnyvale, CA (US)

(72) Inventors: Brian Buege, Sunnyvale, CA (US); Kevin Oelze, Sunnyvale, CA (US); Amish Patel, Sunnyvale, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 594 days.

(21) Appl. No.: 13/941,209

(22) Filed: Jul. 12, 2013

(65) Prior Publication Data

US 2014/0019804 A1 Jan. 16, 2014

Related U.S. Application Data

(60) Provisional application No. 61/671,621, filed on Jul. 13, 2012.

(51) Int. Cl.
*G06F 11/00* (2006.01)
*G06F 11/263* (2006.01)
*G06F 11/22* (2006.01)

(52) U.S. Cl.
CPC ......... *G06F 11/263* (2013.01); *G06F 11/2294* (2013.01)

(58) Field of Classification Search
CPC ............. G06F 11/273; H04L 12/1813; H04L 12/2697; H04L 43/50; H04L 67/38
See application file for complete search history.

(56) References Cited

U.S. PATENT DOCUMENTS 5,608,872 A * 3/1997 Schwartz ............ H04L 12/1813  
    345/502  
6,031,990 A * 2/2000 Sivakumar .......... G06F 11/3664  
    714/E11.208  
6,219,829 B1 * 4/2001 Sivakumar .......... G06F 11/3664  
    714/E11.208

(Continued)

OTHER PUBLICATIONS

Gao, "Cloud Testing—Issues, Challenges, Needs and Practice", Sep. 2011, SOftware engineering: an International Journal, vol. 1 No. 1 p. 9-23.*

(Continued)

*Primary Examiner* — Bryce Bonzo  
*Assistant Examiner* — Jeison C Arcos  
(74) *Attorney, Agent, or Firm* — Haynes Beffel & Wolfeld LLP

(57) ABSTRACT

A system and method for providing assisted manual testing of computer related devices. Test commands are routed from a user system through a proxy module to a device under test. The responses of the device are routed through the proxy module to a user system. A user interface is run on the user system that allows the user to view the responses of the device in a log with the issued test commands. The user interface includes annotation dialog boxes and fields, highlighting elements and flagging elements through which a user can annotate and create notes for the test log as the test is being run on the device. Through the proxy module, a third party can act as a user and view the test log and user created annotations and notes as the test is being run on the device. The test log, annotation and notes can also be stored by the proxy module so that a third party can view them at a later time. The third party can act as a user in issuing commands through the proxy module to be run on the device, thereby assisting in the testing. Additionally, the third party can provide additional notes and annotation to the test log.

25 Claims, 6 Drawing Sheets

(56) References Cited

U.S. PATENT DOCUMENTS

| | | | | |
|---|---|---|---|---|
| 6,473,794 | B1* | 10/2002 | Guheen | H04L 41/22 709/223 |
| 7,296,190 | B2* | 11/2007 | Vakrat | G06F 11/2294 714/38.1 |
| 8,281,187 | B1* | 10/2012 | Desai | H04L 43/50 714/25 |
| 2002/0138226 | A1* | 9/2002 | Doane | G06F 11/2294 702/119 |
| 2003/0074407 | A1* | 4/2003 | Zhang | G06F 11/3672 709/205 |
| 2004/0054728 | A1* | 3/2004 | Rust | G06F 17/30861 709/205 |
| 2005/0229162 | A1* | 10/2005 | Tanner | G06F 11/3696 717/126 |
| 2006/0200520 | A1* | 9/2006 | Vernon | H04L 29/06027 709/204 |
| 2007/0100782 | A1* | 5/2007 | Reed | H04M 3/247 |
| 2008/0072050 | A1* | 3/2008 | Klonover | H04L 12/2697 713/176 |
| 2008/0244315 | A1* | 10/2008 | Johnson | G06F 11/263 714/32 |
| 2008/0270401 | A1* | 10/2008 | Petersen | G01R 31/31718 |
| 2008/0270845 | A1* | 10/2008 | Petersen | G06F 11/321 714/45 |
| 2008/0270847 | A1* | 10/2008 | Connally | G06F 11/273 714/46 |

OTHER PUBLICATIONS

Domenech, "An Experimental framework for testing web prefetching techniques", 2004, Polytechnic University of Valencia, p. 1-8.*

* cited by examiner

METHOD AND DEVICE FOR QUASI-PROXY ASSISTED MANUAL DEVICE TESTING

RELATED APPLICATIONS

This application claims benefit of U.S. Provisional Application No. 61/671,621, filed 13 Jul. 2012, which application is incorporated by reference as if fully set forth herein.

BACKGROUND OF THE INVENTION

Computer-related hardware devices and the software systems that run on such hardware devices undergo testing both before release and after deployment. An example device is a network router. Network routers are tested during deployment and before shipping, they undergo periodic maintenance and are subject to regression testing after new firmware is installed. As such devices and systems have become more complex, the number of testing steps and commands that can be run on a device during a regression test has increased. Due to device and configuration complexity, a tester often manually connects to the device under test (the "DUT") and inputs the test commands during a regression test.

A number of different tools and methods have been developed to aid testers in performing tests on such devices and the software systems that run on such devices. For example, Klonover et al., US Patent Pub. 2008/0072050, teaches providing an application server that allows a test console and its proprietary keys to be positioned on the opposite side of a firewall that separates it from equipment being tested, thereby reducing to risk of attacks that might attempt to compromise the test console.

When a tester is on-site, performing tests in the field, it can be difficult for the tester bring additional expertise to bear or to obtain a third party's assistance. It can be difficult for the tester to adequately convey information regarding the status of a test to the third party, thus the third party can not effectively assist the tester.

An opportunity arises to introduce improved testing systems and methods. Better, more efficient and more effective testing with new levels of information integration can result.

SUMMARY OF THE INVENTION

The technology disclosed relates to assisted manual or partially automated testing of computer-related devices, such as servers, routers, switches and core routers. In particular, it relates to routing test commands or stimulus through a proxy test module that bridges the commands to one or more DUTs and persists messages and message attributes for the test stimulus and responses. One implementation of a proxy test module can bridge connections from systems operated by multiple human testers ("tester systems") to multiple devices and DUTs. The proxy module can receive inputted commands that form a sequence of test steps in a test case from a tester through a tester interface that is run on the tester's system. The proxy module can then place the commands on the command line of the DUT in the order that they form the test case used to test the DUT. Alternatively, the tester can specify through the tester interface a test case that is already stored and have the proxy module inject the stored commands that for a stored test case onto the command line of the DUT. The tester interface is run on a tester system that is coupled in communication with the proxy module such that a tester can control the test as it is being run on the DUT through the proxy module. In some implementations, a tester can stop the test and restart it at any test step.

The responses of the DUT to test stimuli are transferred or bridged through the proxy module to the tester system to be displayed on the tester interface. Such responses are transferred in real time. The tester can view the commands and the responses of the DUT in a test log format as the test is being run. One implementation of the tester interface includes annotation dialog boxes and highlighting and flagging elements. The tester can annotate and add notes to the responses of the DUT. Annotation can be simple as whether or not the DUT passed or failed a certain test step. The annotations and notes can be made to the test log in real time. The annotations and notes that the tester makes are linked in the test log to commands or stimuli and to results of the DUT.

In being coupled in communication with the proxy module, a third party can act as a tester and/or view the results of the test as the test is being run. Annotation and notes made by the tester can also be viewed by the third party as well as the log of the interaction between the tester and the DUT. Test results and annotation and notes that are created by the first tester can be stored by the proxy module. The tester or third party can retrieve and view the test results and annotations and notes. As a result, an efficient means of communication is created between multiple users. The third party can provide assistance to the tester through the proxy module by communicating with the tester. The third party can make additional notes and annotations to the log that the first tester can then receive through the proxy module on the tester interface. The third party can further provide assistance by specifying commands to run on the DUT through the proxy module. Such commands can either be stored on the third party system or by the proxy module.

Particular aspects of the technology disclosed are described in the claims, specification and drawings.

DETAILED DESCRIPTION

The following detailed description is made with reference to the figures. Preferred embodiments are described to illustrate the technology disclosed, not to limit its scope, which is defined by the claims. Those of ordinary skill in the art will recognize a variety of equivalent variations on the description that follows.

Figure 1:
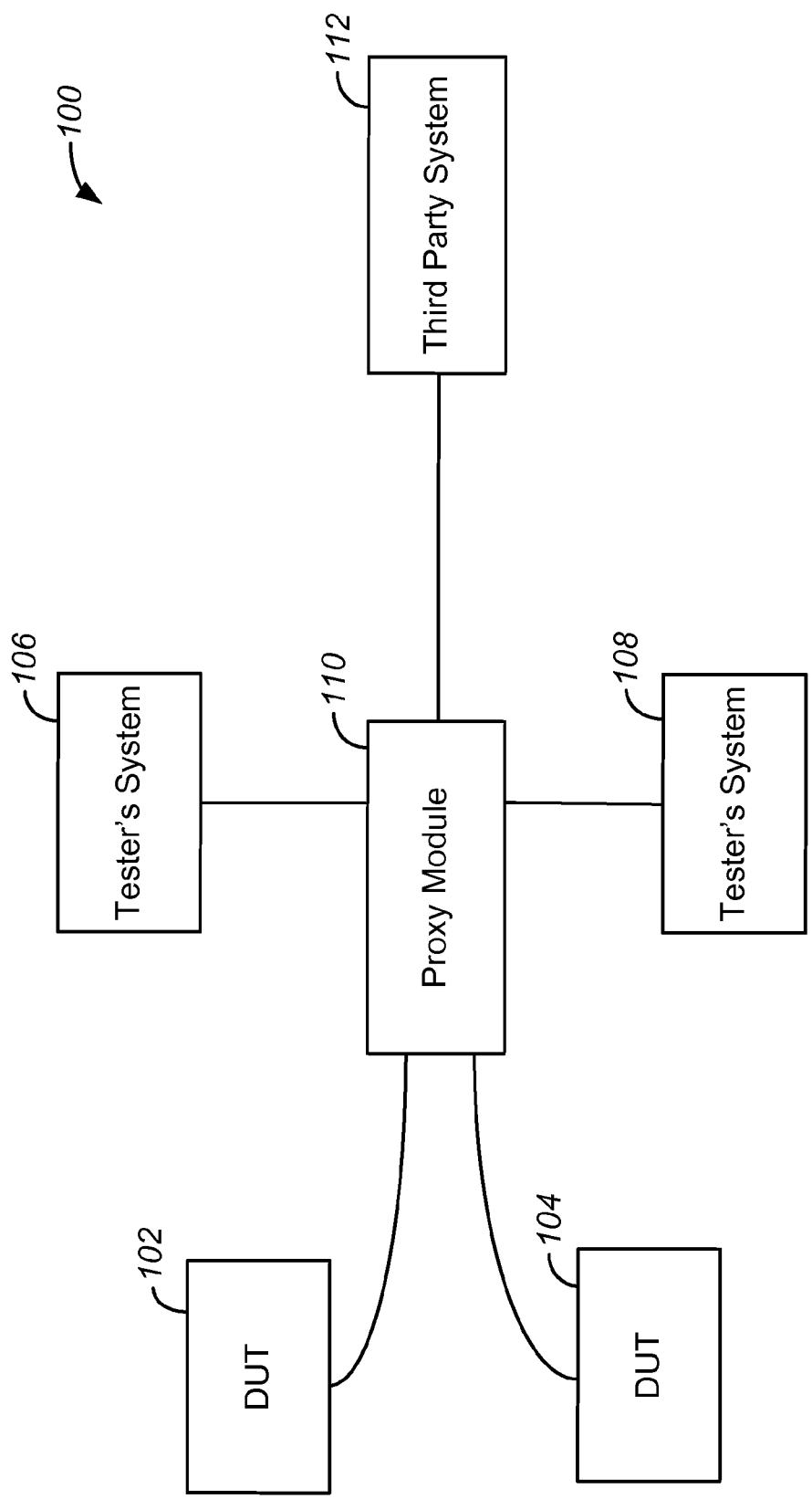
FIG. 1 illustrates a network arrangement including multiple DUTs coupled to a proxy module.

FIG. 1 illustrates a simplified network arrangement that includes multiple DUTs 102, 104 coupled in communication with a proxy module 110. For the sake of clarity, other network elements are omitted. The DUT can be any networked device such as a router, server or switch that a tester is testing. The proxy module 110 is coupled in communications with tester systems 106, 108. The tester systems 106, 108 include interfaces through which commands can be issued to the DUT by the tester. In some implementations, the tester systems include an interface through which the tester can issue a series of commands manually to the DUT as part of a manual test for the DUT. The proxy module can receive the contact information of both the tester and the DUT, such that issued commands are sent through the proxy module from the specific tester to the desired DUT. The DUT, in communication with the proxy module, receives commands from the tester system through the proxy module generated by a tester. In addition to coupling the tester system in communication with the DUT, the proxy module records the commands that are issued to the DUT by the tester. The proxy module can store the commands in cache memory or on persistent storage, such as rotating storage media or a solid state memory.

Storage accessible to the proxy module can store a library of commands used to test DUTS. The DUT can receive commands directly from the proxy module according to a stored script of commands. Such commands can be stored in test sequences. Such stored steps or sequences of steps can be input onto the proxy module through an outside client or retrieved by the tester from previously run tests. As a result, the tester does not need to manually enter each testing command to the DUT. Instead, the tester can choose from a certain test step or sequence of test steps, wherein the testing steps contain sequences of commands that are stored by or accessible to the proxy module. After choosing the test step or sequence of test steps, the sequence of commands that form the test step or the sequence of test steps are then put onto the command line by the proxy module, transmitted to and run on the DUT. This allows for an enhanced degree of automation to the manual test, as the proxy module effectively injects commands that are run on the DUT. As such, the tester can perform previously run tests or stored testing steps and sequences without having to input the commands that make up a testing step that is run in a manual test.

The responses of the DUT are relayed through the proxy module to the tester's system and the tester. By way of example, if the DUT is a router, the test response can include information such as the bandwidth of the router. As the proxy module can have the contact information of both the tester and the DUT, the responses of the desired DUT can be sent through the proxy module to the appropriate tester. The tester acts like a client in requesting the responses of the DUT to issue commands to and receives responses from the DUT through the proxy module. Following up on responses from the DUT, the tester can issue further commands. The proxy module records the responses of the DUT that are transmitted through the proxy module back to the tester's system for display to the tester. The responses can be stored in cache memory on the proxy module, in rotating memory or in solid state memory. The proxy module can record responses from the DUT, automatically capturing the stimuli and responses for the tester.

The proxy module can implement any protocol that is suitable for use with a proxy server. In some implementations, the proxy module can be configured to implement the SSH or SNMP protocols. Alternatively, the proxy module can be configured to implement the http protocol or another web-based protocol. In some implementations, the proxy module can receive requests from and be accessed through conventional web browsers.

The proxy module can be coupled in communication with at least one third party system 112. The proxy module records the interaction between the tester and the DUT. Commands and responses to the commands pass through the proxy module and can be recorded by the proxy module for later viewing. A third party system 112 can access a record of interactions through the proxy module. The proxy module can receive and store contact information from the third party. Information that is stored on or by the proxy module can be sent from the proxy module to the appropriate third party. The third party requests viewing of the commands issued during a test and the responses of the DUT to such commands which are stored by the proxy module and supplied to the third party at the request of the third party. The proxy module captures and stores the interactions between the tester and the DUT. This allows a third party to view the interactions between the tester and the DUT using the third party system 112, without the tester having to store the test results on a separate server. As a result, the third party can assist the tester in real time as the tester runs a manual or semi-automated test. In some implementations, the third party can see that the DUT responded to a command in a certain way and suggest and communicate to the tester the next testing steps that the tester should run. Such communication can occur through a user-to-user chat or interaction application of the proxy module or another channel.

Additionally, the third party can act as a second tester and issue commands to the DUT. In some implementations, as the DUT receives all commands through the proxy module. Since the third party is coupled in communication with the proxy module, the third party can issue commands through the proxy module. The DUT can receive and run the commands issued by the third party through the proxy module. The commands can be relayed in a manner that leaves the DUT unaware that more than one tester is issuing commands. The third party can be a supervisor or colleague of the tester who can take over running a manual test when the tester runs into problems in performing the manual test on the DUT. Since the proxy server is coupled in communication with the DUT and the third party, the third party can view the response of the DUT and issue commands to be run on the DUT in real time. In some implementations, the third party can direct the proxy server to place commands on the command line transmitted to and run by the DUT. In this way, the third party can assist the tester. The third party can issue commands in a pre-constructed sequence that for a testing step or sequence of testing steps, depending on the specific testing situation.

As the tester's system is coupled in communication with the proxy module, the tester can see the commands that are input to the DUT by the third party through the proxy module. In some implementations, the tester's system can request and receive the commands that are input by the third party onto the proxy module. As such, the tester can see the commands that form testing steps and sequences of steps entered by the third party and remain an active participant in the test.

Figure 2:
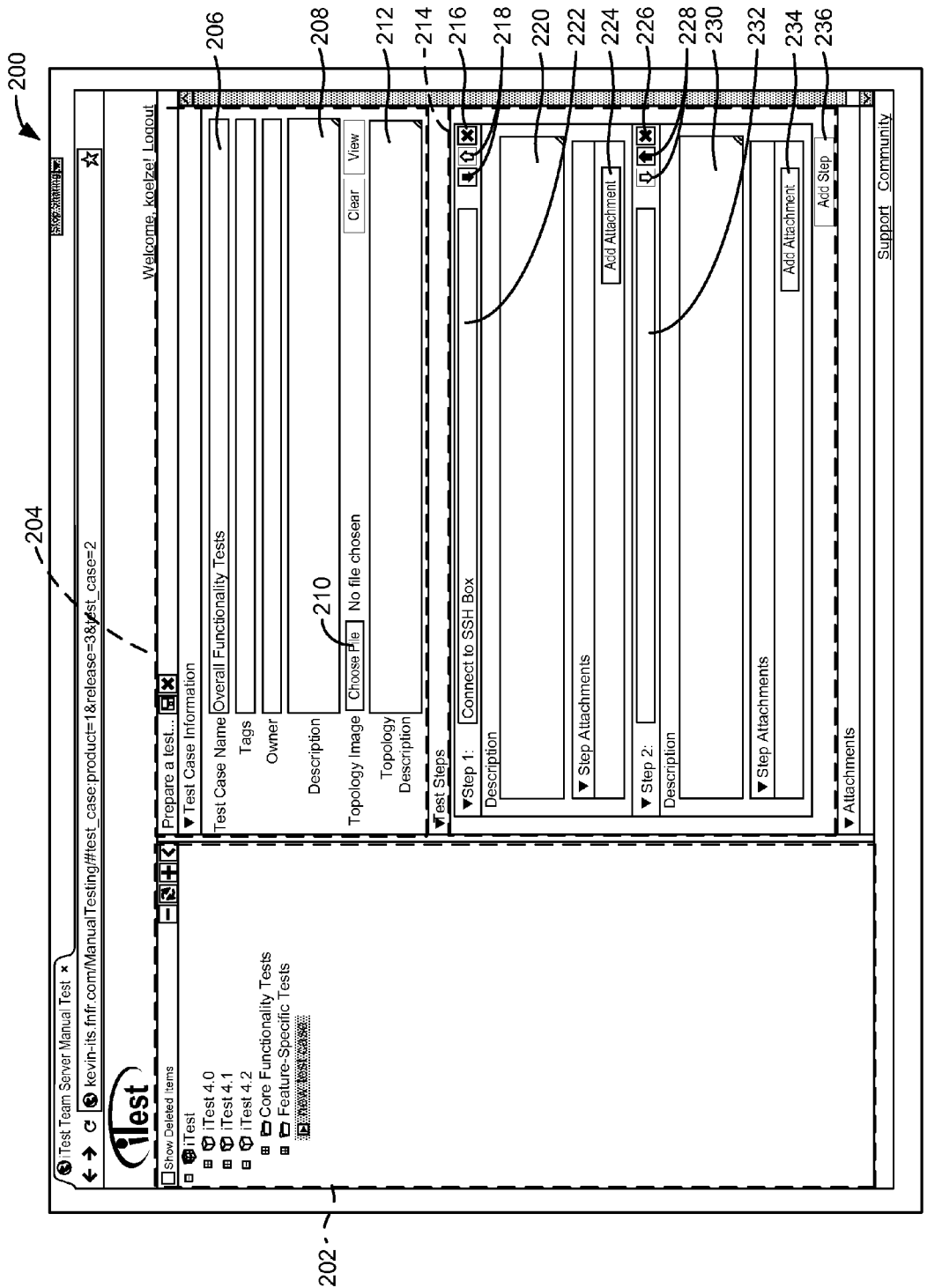
FIG. 2 shows a user interface through which a party can issue commands to a DUT.

FIG. 2 shows a user interface 200 through which a user, sometimes referred to as a tester, can issue commands to a DUT using a command line interface. In some implementations, the user is free to select their own preferred SSH or command line interface tool. The user interface 200 can include docking or simply interacting with the user's selected tool. The user interface 200 can be run on either a tester's system or a third party system such that a tester, a third party or both are users. The user interface can be run through and provide access to the proxy module. Interactions through the user interface can be accessible through the proxy module in real time and can be stored by the proxy module for later viewing. Users who have access to the proxy module can view the interactions of other users through the shared proxy module. A user can login to the proxy module by logging, for instance, via a browser-based user interface. Logging into the user interface can cause the user interface to send the proxy module the user's contact information. The proxy module receives and uses the user contact information. As the DUT is coupled in communication with the proxy module, the proxy module can then send the received contact information of the user to the DUT. As a result, stored interactions between the DUT and the user can be organized based in part on the user contact information. This allows third parties to easily access the stored interactions based on the contact information of the user or tester.

The user interface 200 can include a user interface control element 202 that can list the tests or sequence of tests that make up a test case so that a user can select a test case. The commands in the test can be loaded onto the command line of the DUT through the proxy server. Furthermore, the interface control element can be used to organize test steps and sequences of test steps so that the user can easily find the desired step(s) of a test case. A user can efficiently issue commands that make up a test step or sequence of test steps by selecting the desired test case. Test steps and sequences of test steps that displayed through the user interface control element and the corresponding commands that make up the test step or sequence of test steps can either be saved or loaded from the proxy module or the tester's or third party system.

As is shown in FIG. 2, the user interface control element 202 can include a drop down list. The drop down list can list the various test steps or sequences of test steps that make up a test case in directories based on a number of factors. In one implementation, the test steps can be listed in directories based on whether or not the test steps make up a test case that is used to determine the core functionality of generic types of DUT. In other implementations, the test steps can be listed in directories based on whether or not the test steps make up a test case that is used to determine the functioning of a specific feature of a unique DUT. The test steps and sequence of test steps that make up test cases can also be listed in directories based on the user who used the test cases and the type of devices on which the test cases are run. Alternatively, the test cases can be separated and organized based on the specific device that such test case is being used on even if the same test case is being run on different devices.

Also shown in FIG. 2, the user interface can include a test case description element 204. The test case description element 204 can take up a portion of the user interface and can be shown simultaneously with the interface control element 202 within the user interface 200. The test case description element corresponds to the test case that the user selects and can be stored on either the tester's system, the third party system, or by the proxy module along with the test case and the corresponding commands. The test case description element can be stored. Therefore, whenever a test case is selected through the interface control element, the test case description element that is stored and corresponds to the test case can be shown on the graphical user interface. The test case description element can include a name field 206 in which a user can modify the name of the test case that has been selected using the interface control element. The test case description element can also include a test case description field 208. The test case description field 208 is a field in which the user can insert text that describes the test case. The test case description element can also include a topology description field 212. The topology description field 212 is a field in which the user can insert text to describe the topology of the DUT in relation to the network in which the DUT exists in. By way of example, if the DUT is a router, the test topology could include the devices that the router is coupled in communication with in the network and how those devices are coupled in communication with each other within the network. The test case description element also can include an attachment element 210. This interface operation element can be used to attach an image of the topology of the network including the DUT. Activating such attachment element 210 can provide access to the stored data on the system in which the graphical user interface is being run on so that a desired topology image can be selected. The stored data on the system can be displayed after activation of the button in various ways, including but not limited to through a dialog box. Selection of the desired topology image associates the image with the specific test case and for which the description is created. The topology image can be transmitted to user system automatically when a user selects a test case.

The interface can include a test step description element 214. The test steps description element 214 can take up a portion of the user interface and can be shown simultaneously with either or both the interface control element 202 or the test case description element 204. The test steps description element 214 corresponds to the test case that the user selects and that can be stored on either the tester's system, the third party system or the proxy module along with the test case and the corresponding commands. The test steps description element can display the test steps based on the order of the test steps within the test case. Within the test step description element are test step name fields 222, 232 in which a user can insert or edit the name of each individual test step. The test description element includes test step description fields 220, 230, which can be used to describe the corresponding test step. The test description element can include attachment elements 224, 234 for each test step. Attachment elements 224, 234 allow a user to link to data or files which the user can access and select. The data or files can include a stored sequence of commands that form a test step. The data or files referenced by the attachment elements can be located on the system of the user, the proxy module or any storage that is coupled in communication with the proxy module.

The test step description element 214 can also include step removal elements 216, 226 and step ordering elements 218, 228. Step removal elements 216, 226 correspond to a step in the test case. When activated, they remove the step from the test case. Likewise, step ordering elements 218, 228 cause a test step to move either up or down within the sequence of test steps. The test description element also includes an add step element 236. The add step element is an interface operation element that allows a user to add an additional test step. Activation of the add step element adds a test step to the series of test steps that make up a test case in the test step description element. As with the other test steps, this creates a name and description field. Activation of the add step element further creates a new additional test step with an attachment element through which a user can attach data or files to associate with the test step. Such data or files can include the commands that are issued to a DUT in completing a test step.

The interface can be the same interface that the third party system uses to interact with the proxy module. Furthermore, any user of the interface can save the entered text or files in the test case description element and the test step description element onto the proxy module. As a result, another user can access the proxy module through the interface and see what the user has inputted into the interface. As the information that is inputted into the interface can be directly transferred onto the proxy server, one user can effectively see the interface of another in real time. In some implementations, a tester can be in the field testing a DUT, while a third party follows along in real time from a home office. A third party can view the test case description information while or after the test has been performed.

Figure 3:
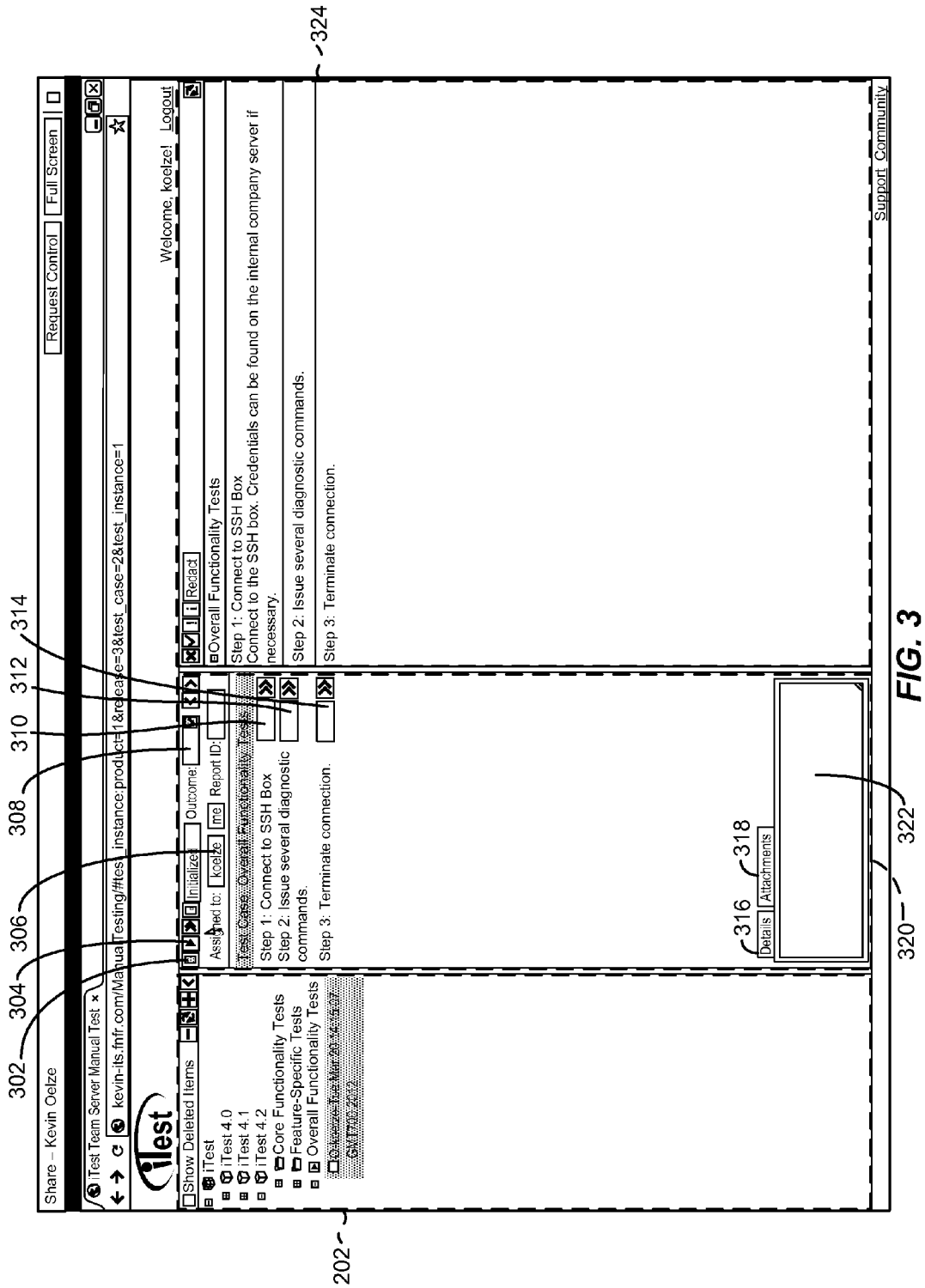
FIG. 3 shows a user interface at the start of running a manual test on a DUT by beginning a test step or sequence of steps that comprise a test case.

FIG. 3 shows an implementation of a user interface at the beginning of the running of a test. It shows an example of a three-step test case. The user interface can include a test control element 320 that is used as an overall test steps diagnostic. The test control element 320 can be shown simultaneously with the user interface control element 202 within the user interface. The test control element 320 can include a tester identification field 306 that identifies the tester. The identification of the tester is received by the proxy module when the tester logs into the interface. The proxy module can populate the tester identification field 306 when accessed by a third party.

The test control element 320 can also include a list of testing steps. Testing step can be named. For example, as shown in FIG. 3, the list includes "Step 1: connect to SSH Box", "Step 2: issue several diagnostic commands" and "Step 3: terminate connection". Testing steps can include an evaluation field 310, 312, 314. Evaluation fields 310, 312, 314 correspond to test steps in the test case. The evaluation fields can be filled with information as to how the DUT performed during the corresponding test step of the test case. In one example, the evaluation field can simply be a drop down list from which a user can select whether or not the DUT passed or failed the step. In some implementations, the evaluation field can be populated with simply "Pass" or "Fail" depending on whether or not, according to the user, the DUT passed or failed the test step. The test control element can also include a test case overall evaluation field 308. The test case overall evaluation field 308 is a field that a user can populate with information based on whether or not the DUT passed the overall test case, instead of whether or not the DUT just passed the individual test steps of the test case. Evaluation fields can be nested.

The test control element 320 can also include operational elements 302, 304 that allow the user to control the running of the test steps against the DUT. In some implementations, the test control element includes a stop operational element 302 that when activated, stops the test step. The test control element also includes a start operational element 304 that when activated, starts the test either from the beginning or the place at which the test case was stopped. This allows for a greater degree of control over testing, as the user can stop a test and change testing steps based on how a DUT responds. Furthermore, this also allows for a user to stop a test case if a device is undergoing a failure that would make the test unmeaningful or could cause damage to the DUT.

The test control element 320 can also include a description field 322 and an attachment element field (not shown). The description field and attachment element field can be accessed through a description field tab 316 and an attachment element tab 318. The description field 322 can be populated with information that was entered by a user in the test case description field 208 or the test step description fields 220, 230 or directly through the test control element 320. The attachment element field can list and provide a link to a file that was previously attached in either the test case description element 204 or the test step description element 214, or directly through the test control element 320.

FIG. 3 shows one implementation if a user interface that can include a test log element 324. The test log element can show a real time log of testing steps. In one example, the first testing step can be the formation of a connection to the DUT. Such connection can be formed between the proxy server and the DUT, using the contact information that specifies the DUT. Subsequent commands can be put on the command line and run in the desired order by the tester. The commands that form the test steps of the test case can be stored by the proxy module so the user does not need to manually input each command. In some implementations, the user can select commands that are saved by the proxy module. Commands can grouped, for instance based on a specific test case or on a device type being tested. This allows partial automation, as the user can have the proxy module inject a selected series of commands. By storing the test case and the associated commands on storage accessible to the proxy module, a third party user can view the test steps before they run and add any input from the third party or make changes to the commands that form the test case.

Figure 4:
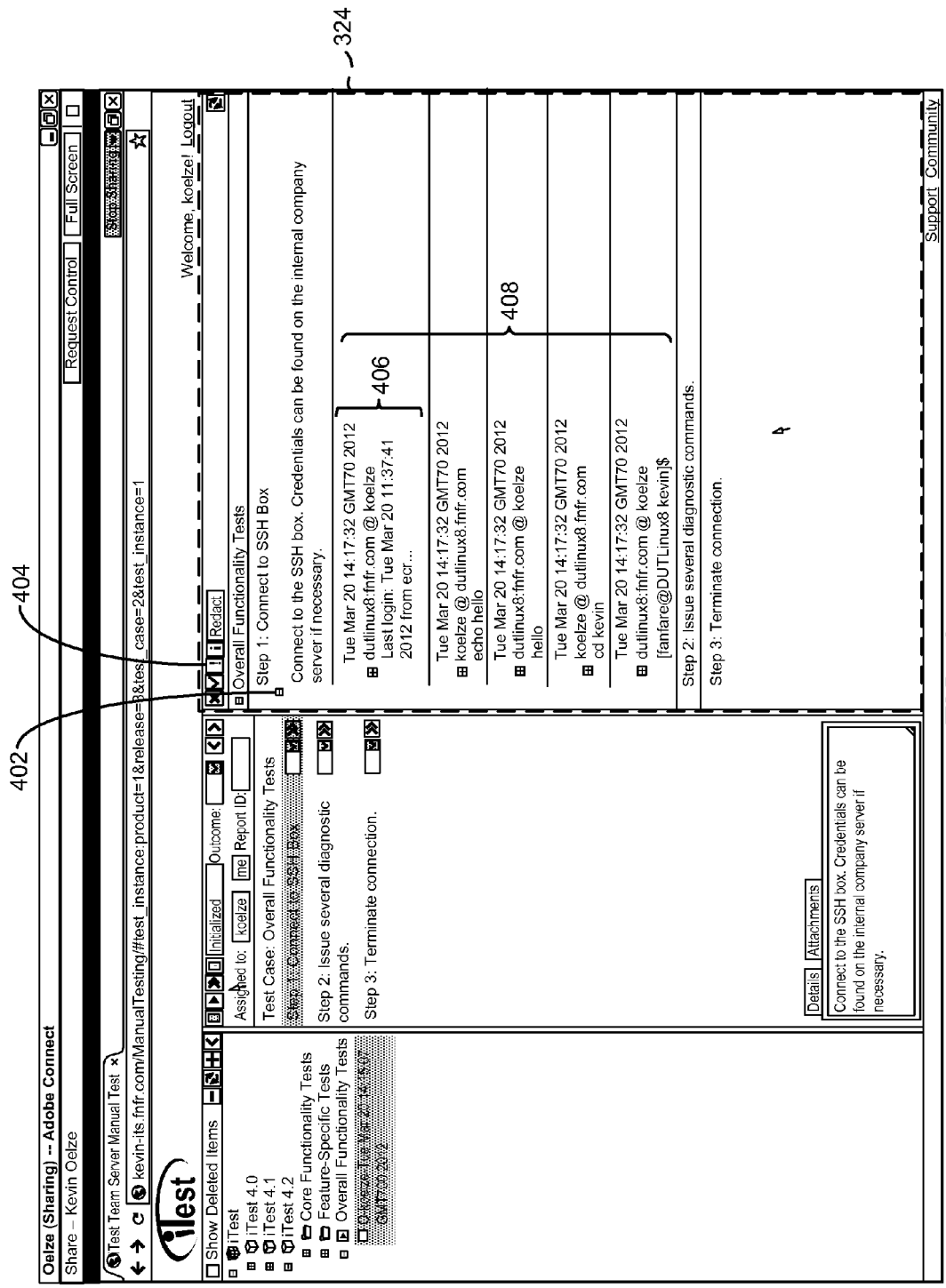
FIG. 4 shows a user interface during the running of a manual test on a DUT by running a test step or sequence of steps that comprise a test case.

FIG. 4 shows one implementation of a user interface during the running of a manual or partially automated test. The user interface can from a tester's system, a third party's system, or both. The user interface can include a test log element 324. The test log element 324 can display the test steps that form a test case. The test log element can also provide a display of the individual commands 406 that make up a test step in the test case. In some implementations, as shown in FIG. 4, each test command 406 can be displayed in the sequence in which the test commands form the testing step. The test commands can be displayed under the test step in which the test commands form. Additionally, the test commands can be displayed in a drop down hierarchical list 408 under the test step that the test commands in combination form. Such drop down list 408 can be controlled to be hidden or displayed using a test command viewability element 402. Activation of the test command viewability element 402 allows the user to either hide or display nested test commands. This is advantageous in test cases that utilize test steps with a large number of test.

The test log element 324 can also include a flagging element 404. The flagging element 404 when activated creates indicia on the selected element that is flagged. The user can use the flagging element to flag either a test step in the test case or any test command that forms the test step. A user can use the flagging element to create indicia within the test log element 324. Such indicia can be created next to a test step that was not performed properly or a test command that was not performed properly. As such, the indicia can be used as an indicator to the user who flagged the test step or command that forms a test step, or any other user who views the test case that the DUT did not perform properly when running the flagged test step or command. This allows for an increased degree of user annotation ability, as by flagging with indicia, the user can essentially make comments to the results of the test or the test log through the addition of such indicia. As the user system is coupled in communication with the proxy module, another user or third party can access the test log element and see what another user has flagged, and can thereby providing assistance to the user.

Figure 5:
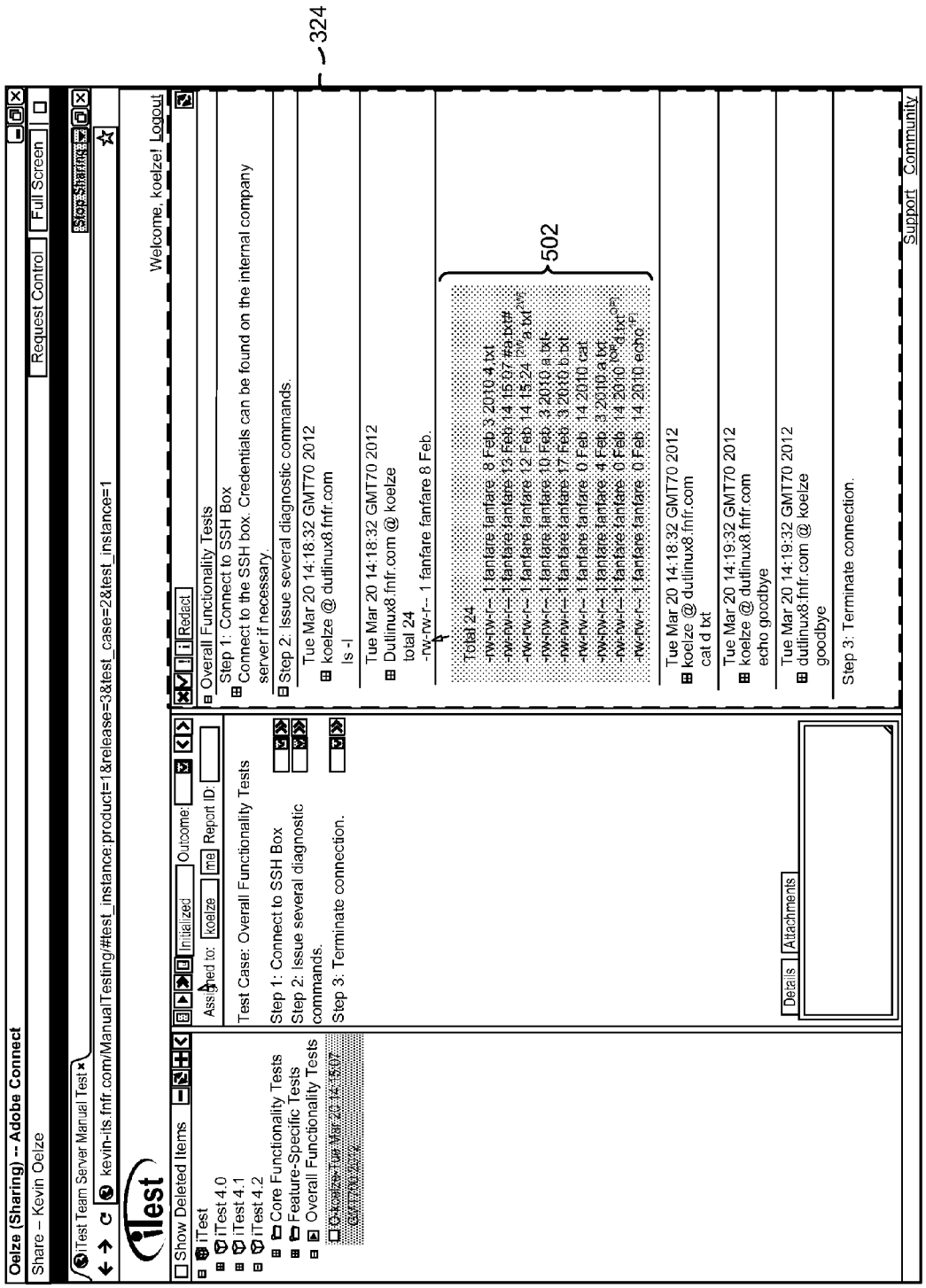
FIG. 5 shows a user interface with a portion of highlighted text.

FIG. 5 shows one implementation of a user interface with user highlighted text 502. The user interface can include a highlighting element that when activated allows a user to highlight text within the test log element 324. The highlighted text 502 is illuminated with a different color than the screen of the test log element 324. The user can highlight text based on the response of the DUT during the test. Such highlighted text 502 can be a test command that is part of a test step or an entire test step that is part of the test case. The user can highlight multiple areas within the test log element 324 such that multiple test commands or test steps can be highlighted. The user can highlight the test to signify that the DUT did not perform properly during the highlighted portion of the test case. The highlighted information can be stored by the proxy server and any user or third party can access the information displayed in the test log element 324, including the highlighted text with the highlighting. As a result of such highlighting, the degree of user annotation ability is increased as the user can essentially make comments to the results of the test using such highlighting and another user or third party can view such highlighting performed by the user. A third party can view highlighted text in the test log through the proxy module.

Figure 6:
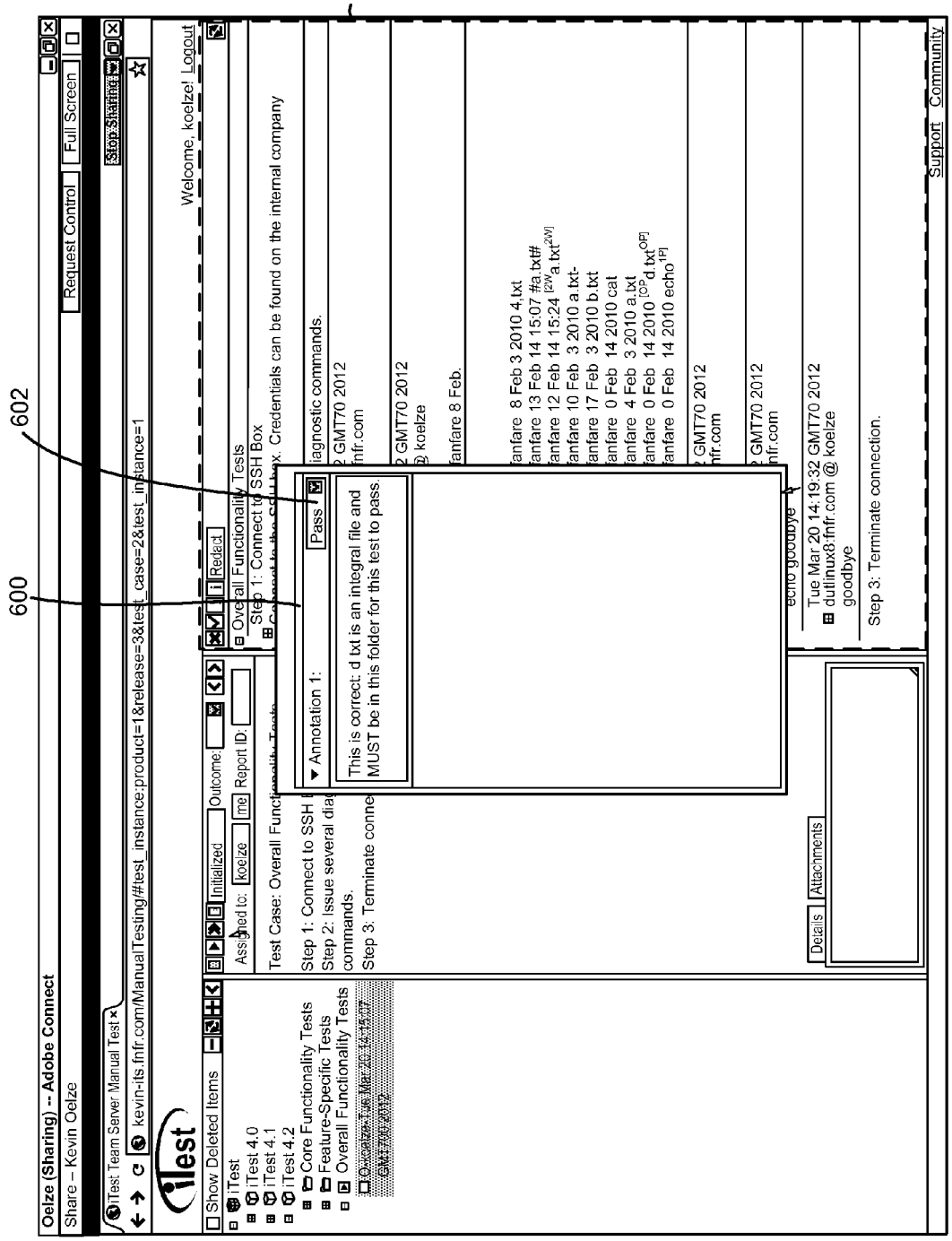
FIG. 6 shows a user interface with an annotation dialog box.

FIG. 6 shows one implementation of a user interface with an annotation dialog box 600. The annotation dialog box 600 can be used by the user to add notes to the test based on the way the DUT performs when given a certain test command that forms part of a test step. By way of example, if the DUT fails a test because it does not function properly when running one of the commands or a series of commands that form a test case, the user can make a note using the annotation dialog box. The annotation dialog box can be associated with a specific test command, test step, or the overall test case. The annotation dialog box can include an evaluation field 602. The evaluation field 602, just like the evaluation fields shown in FIG. 3, can be populated with information on whether or not the DUT passed or failed the associated test step or overall test case. The evaluation field can be populated with information that the user directly inputs into the annotation dialog box, or it can be populated with information that the user inputted into the test control element. In some implementations, the evaluation field can be a drop down list from which a user can select "pass" or "fail" based on whether or not the device passed or failed the specific test step or overall test case. The evaluation field can be a drop down list from which a user can select "warn". The "warn" annotation can be used to signal to any user that there is a potential problem with the test command, test step or overall test case in which the annotation dialog box is associated with.

As shown in FIG. 6, the user interface can include a test log element 324. The test log element 324, as discussed previously. The user interface can provide a linking element that allows the user to embed a link in either the test command or test step or the overall test case in which the annotation dialog box is associated with. A link can be within a test command, test step or test case any user can activate the link to open the annotation dialog box. This allows for an increased degree of annotation ability as a user can provide notes about a testing step in an organized format. Furthermore, the user can provide the notes as the test is occurring. As a result, the user does not have to try and remember what notes to make after the test is run, thereby reducing the risk of losing information.

The user interface can be run on a user system that is coupled in communication with the proxy module, and the annotation notes that are input through the annotation dialog box and the links that are created within the test log element can be routed through the proxy module. As a result, any third party or other user can access the test case through the proxy module and see the notes and associated links that the user creates. Such third party can provide assisted testing to the user by being able to view these links and provide feedback through the proxy module. In addition, the third party can also make their own annotations, whereby such annotations are routed through the proxy module, thereby further providing assistance to the user. The links can have indicia that distinguish the link from the text that is displayed within the test log element. As a result, any user can easily determine that a link exists and subsequently activate such link. In some implementations, a third party can easily access the test case through the proxy module and see that a link does exist in an efficient manner.

Some Particular Implementations

In one implementation, a method for managing manual or partially automated testing of at least one electronic DUT is provided. The method includes coupling a proxy module running on a processor in communication between at least one client running on at least one tester system and at least one DUT. The method also includes receiving tester contact information, wherein the tester contact information identifies a tester using the tester system client to test the DUT, and receiving DUT contact information that identifies the DUT. The method further includes receiving and relaying test stimulus information from the tester system client and test response information from the DUT. The test stimulus information is linked to or associated with the tester contact information and the test response information is linked to or associated with the DUT contact information. The method further includes receiving tester annotation information generated by the tester and linking it to or associating it with one or more items of the test stimulus or test response information from a tester and storing at least some items of received information from the test as a transcript of testing the DUT.

One or more of the following implementation items can be combined with the methods described. In one implementation, the tester annotation information includes a pass fail evaluation of at least one testing step. In another implementation, the tester annotation information includes a narrative of the performance of the DUT from the tester. In one implementation the test response information and the tester annotation information is presented to the tester through a tester interface. In another implementation, the test response information and the tester annotation information is presented to the user as a log, wherein the test response information and associated tester annotation information is presented in the same window of the tester interface.

In one implementation, the DUT contact information of the associated test response information is presented to the tester through the tester interface. In one implementation, the test stimulus information is presented to the tester through the tester interface. In another implementation the test annotation information is received after the completion of one testing step. In another implementation the DUT is a network component.

In one implementation, at least some of the stored receive information from the test is provided to a third party through a third party user interface from the proxy module. In another implementation, annotation information associated with one or more items of the test stimulus or test response information is received from a third party through the third party user interface and such third party user annotation information is stored by the proxy module. In another implementation, the third party annotation information is either presented to the tester through the tester interface or to the third party through the third party user interface. In another implementation, the test response information is presented together with the associated third party annotation information to either the tester or the third party as a log, wherein the test response information and the associated third party annotation information is presented in the same window of either the tester interface or the third party user interface. In one implementation the test information, the third party annotation information and the tester annotation information is presented to either the tester or third party as a log in the same window of either the tester interface of the third party user interface. In one implementation, the third party annotation information is presented in a form that is distinct from the form in which the user annotation information is presented. In another implementation, the test stimulus information is retrieved from a previously run stored test. In another implementation, the test stimulus information is manually input by the tester.

Each of the preceding methods and any of the their implementation options can be practiced as systems or articles of manufacture. Systems practice the methods by using electronic hardware and software, firmware or logic to implement the methods described. Articles of manufacture include machine readable storage media that stores program instructions. The program instructions, when run on suitable electronic hardware can perform the methods described. When loaded onto electronic hardware the combination can produce any of the systems described.

We claim as follows:

1. A method for managing a manual testing of at least one electronic device under test (abbreviated DUT), including:
   coupling a proxy module running on a processor in communication between at least one client running on at least one tester system and at least one DUT;
   receiving tester contact information, wherein the tester contact information identifies a tester using the tester system client to test the DUT;
   receiving DUT contact information that identifies the DUT;
   receiving and relaying test stimulus information from the tester system client and test response information from the DUT;
   linking the test stimulus information with the tester contact information and the test response information with the DUT contact information;
   receiving tester annotation information generated by the tester after a completion of at least one testing step and linking the tester annotation information with one or more items of the test stimulus information or the test response information; and
   storing at least some linked items of received information from the test as a transcript of testing the DUT.

2. The method of claim 1, wherein the tester annotation information includes a pass fail evaluation of at least one testing step.

3. The method of claim 1, wherein the tester annotation information includes a narrative of performance of the DUT generated by the tester.

4. The method of claim 1, further including transmitting the test response information and the tester annotation information to be displayed to the tester through a tester interface.

5. The method of claim 4, wherein the test response information and the tester annotation information are formatted for display as a log, and wherein the test response information and the linked tester annotation information are formatted to be displayed together in a window of the tester interface.

6. The method of claim 4, further including transmitting the DUT contact information of the linked test response information to be displayed to the tester through the tester interface.

7. The method of claim 4, further including transmitting the test stimulus information to be displayed to the tester through the tester interface.

8. The method of claim 1, wherein the DUT is a network component.

9. The method of claim 1, further including transmitting, from the proxy module, at least some of the stored transcript of testing the DUT to be displayed to a third party through a third party user interface, while the tester continues to use the proxy module testing the DUT.

10. The method of claim 9, further including:
    receiving third party annotation information generated by the third party and linking the received third party annotation information with one or more items of the test stimulus information or the test response information; and
    storing the third party annotation information on storage accessible by the proxy module.

11. The method of claim 10, wherein the third party annotation information includes a narrative of a performance of the DUT generated by the third party.

12. The method of claim 10, further including transmitting the third party annotation information to be displayed to either the tester through the tester interface or the third party through the third party user interface.

13. The method of claim 10, further including transmitting the test response information together with the linked third party annotation information to be displayed to either the tester or the third party as a log,
    wherein the test response information and the linked third party annotation information are formatted to be displayed together in a window of either the tester interface or the third party user interface.

14. The method of claim 10, further including transmitting the test response information and both the third party annotation information and the tester annotation information to be displayed to either the tester or the third party as a log,
    wherein the test response information, the third party annotation information and the tester annotation information are formatted to be displayed together in a window of either the tester interface or the third party user interface.

15. The method of claim 14, wherein the third party annotation information is formatted to be visually distinct from the tester annotation information.

16. The method of claim 1, wherein at least part of the test stimulus information is replayed from a stored transcript of a previously run test.

17. The method of claim 1, wherein at least part of the test stimulus information is manually input by the tester during the testing of the DUT.

18. A system for managing a manual testing of at least one electronic device under test (abbreviated DUT), including:
    a proxy module running on at least one processor in communication between at least one client running on at least one tester system and at least one DUT, wherein the proxy module is configured to:
    receive tester contact information, wherein the tester contact information identifies a tester using the tester system client to test the DUT;

receive DUT contact information that identifies the DUT;

receive and relay test stimulus information from the system client and test response information from the DUT;

associate the test stimulus information with the tester contact information and the test response information with the DUT contact information;

receive tester annotation information generated by the tester after a completion of at least one testing step and associate the tester annotation information with one or more items of the test stimulus information or the test response information from a tester; and store at least some items of received information from the test as a transcript of testing the DUT.

19. The system of claim 18, wherein the tester annotation information includes a pass fail evaluation of at least one testing step.

20. The system of claim 18, wherein the tester annotation information includes a narrative of a performance of the DUT from the tester.

21. The system of claim 18, wherein the proxy module is further configured to:

transmit at least some of the stored transcript of testing the DUT to a third party through a third party user interface;

receive third party annotation information associated with one or more items of the test stimulus information or the test response information, the third party annotation information being received from the third party through the third party user interface; and store the third party annotation information on storage accessible by the proxy module.

22. A non-transitory computer readable storage medium impressed with computer program instructions for managing a manual testing of at least one electronic device under test (abbreviated DUT), the instructions, when executed on a processor, implement a method comprising:

receiving tester contact information, wherein the tester contact information identifies a tester using a tester system client to test the DUT;

receiving DUT contact information that identifies the DUT;

receiving and relaying test stimulus information from the tester system client and test response information from the DUT;

associating the test stimulus information with the tester contact information and the test response information with the DUT contact information;

receiving tester annotation information generated by the tester after a completion of at least one testing step and associating the tester annotation information with one or more items of the test stimulus information or the test response information; and storing at least some items of received information from the test as a transcript of testing the DUT.

23. The non-transitory computer readable storage medium of claim 22, wherein the tester annotation information includes a pass fail evaluation of at least one testing step.

24. The non-transitory computer readable storage medium of claim 22, wherein the tester annotation information includes a narrative of a performance of the DUT from the tester.

25. The non-transitory computer readable storage medium of claim 22, wherein the method further comprises:

transmitting at least some of the stored transcript of testing the DUT to a third party through a third party user interface;

receiving third party annotation information associated with one or more items of the test stimulus information or the test response information, the third party annotation information being received from the third party through the third party user interface; and storing the third party annotation information on storage.

* * * * *

UNITED STATES PATENT AND TRADEMARK OFFICE
CERTIFICATE OF CORRECTION

PATENT NO. : 9,495,267 B2
APPLICATION NO. : 13/941209
DATED : November 15, 2016
INVENTOR(S) : Buege et al.

Page 1 of 1

It is certified that error appears in the above-identified patent and that said Letters Patent is hereby corrected as shown below:

In Claim 3, Column 11, Line 58, insert --a-- before "performance"; and

In Claim 18, Column 13, Line 4, insert --tester-- before "system".

Signed and Sealed this
Eighth Day of August, 2017

Joseph Matal
*Performing the Functions and Duties of the*
*Under Secretary of Commerce for Intellectual Property and*
*Director of the United States Patent and Trademark Office*